(12) United States Patent
Goldblatt et al.

(10) Patent No.: US 8,121,550 B2
(45) Date of Patent: Feb. 21, 2012

(54) SATELLITE INTERFERENCE CANCELING

(75) Inventors: Jeremy Goldblatt, Encinitas, CA (US);
Keith Bargroff, San Diego, CA (US);
Branislav Petrovic, La Jolla, CA (US)

(73) Assignee: RF Magic, Inc., San Diego, CA (US)

( * ) Notice: Subject to any disclaimer, the term of this patent is extended or adjusted under 35 U.S.C. 154(b) by 548 days.

(21) Appl. No.: 12/301,229

(22) PCT Filed: Jun. 29, 2007

(86) PCT No.: PCT/US2007/072592
§ 371 (c)(1),
(2), (4) Date: Nov. 17, 2008

(87) PCT Pub. No.: WO2008/066968
PCT Pub. Date: Jun. 5, 2008

(65) Prior Publication Data
US 2009/0102706 A1    Apr. 23, 2009

Related U.S. Application Data

(60) Provisional application No. 60/817,951, filed on Jun. 30, 2006, provisional application No. 60/839,860, filed on Aug. 24, 2006, provisional application No. 60/870,609, filed on Dec. 18, 2006.

(51) Int. Cl.
*H04B 1/00* (2006.01)
*H04B 15/00* (2006.01)

(52) U.S. Cl. .................................. 455/63.1; 455/67.13
(58) Field of Classification Search .................. None
See application file for complete search history.

(56) References Cited

U.S. PATENT DOCUMENTS

| | | | |
|---|---|---|---|
| 4,697,188 A | | 9/1987 | Lin |
| 4,734,701 A | * | 3/1988 | Grobert ........................ 342/380 |
| 5,363,111 A | * | 11/1994 | Murphy ........................ 342/383 |
| 5,901,343 A | * | 5/1999 | Lange .......................... 455/63.1 |
| 6,892,060 B2 | * | 5/2005 | Zheng ........................... 455/302 |
| 2002/0197958 A1 | | 12/2002 | Collins |
| 2004/0042569 A1 | | 3/2004 | Casabona |
| 2006/0135101 A1 | * | 6/2006 | Binshtok et al. .......... 455/232.1 |

FOREIGN PATENT DOCUMENTS

| | | |
|---|---|---|
| EP | 0331411 A | 9/1989 |
| EP | 0570166 A | 11/1993 |

* cited by examiner

*Primary Examiner* — Tuan T Lam
(74) *Attorney, Agent, or Firm* — Bruce W. Greenhaus

(57) ABSTRACT

A satellite interference canceling system cancels the interference between two or more signals received by a satellite receiver. The signals can be two signals experiencing cross polarization interference or signals that experience interference from other satellite signals. Gain and phase are applied to the received signals and then combined with the other signals to result in cancellation by subtraction. The gain and phase values needed to cancel the interference are derived from measurements of carrier-to-noise ratio (C/N) as an indication of the interference level. The C/N can be measured in the set-top box indoor unit. Coherency restoration is performed in receivers that downconvert the signals before performing interference cancellation.

14 Claims, 14 Drawing Sheets

Example of LNB with DRO LO

SATELLITE INTERFERENCE CANCELING

RELATED APPLICATIONS

This application claims priority from U.S. provisional application No. 60/817,951 filed Jun. 30, 2006 entitled "Satellite cross polarization canceling", incorporated herein by reference.

This application claims priority from U.S. provisional application No. 60/839,860 filed Aug. 24, 2006 entitled "Satellite interference canceling", incorporated herein by reference.

This application claims priority from U.S. provisional application No. 60/870,609 filed Dec. 18, 2006 entitled "Satellite interference canceling and frequency translation", incorporated herein by reference.

BACKGROUND

1. Field of the Invention

This invention relates generally to reducing interference in a satellite receiving system that is caused by other satellite signals being received and processed by the system.

2. Prior Art

Satellite broadcast signals are made spatially orthogonal by a combination of antenna design and signal timing in order to reuse the frequency spectrum of the signals. Two signals that share an overlapping frequency are polarized when transmitted to allow separation at the receiver. Due to atmospheric conditions, antenna design limitations, signal dish and antenna alignment, as well as signal isolation (internal to the low-noise block converter (LNB) or switch) it is inevitable that the two polarizing mechanisms of the signals occupying the same frequency will interfere with each other. A common term for this is cross polarization interference.

U.S. Pat. No. 5,760,740 to Blodgett, issued Jun. 2, 1998, entitled "Apparatus and method for electronic polarization correction," incorporated herein by reference, describes a circuit arrangement that applies the antenna output signals to a combiner at an optimized relative amplitude and phase to substantially cancel the received cross polarized energy of a second electromagnetic signal.

U.S. Pat. No. 4,106,015 to Beguin et al., issued Aug. 8, 1978, entitled "Radar system with circular polarized transmission and adaptive rain depolarization compensation," incorporated herein by reference, describes an apparatus for detecting variations of phase between two received channels and automatically adjusting amplitude and phase of at least one of the two channels in order to compensate for the depolarization effects of rain.

From the perspective of the receiving and transmitting antenna, the signals are polarized with a vertical only or a horizontal only component. The wave of each signal travels from transmitter to receiver in the exact same physical orientation of which it left the transmitter. An analogy is in a simple sunlight filtering using polarized lenses where the horizontal light is seen by orienting a polarized lens so the horizontal component of light can be seen and the vertical component is removed. Separately, when another polarized lens is rotated 90 degrees relative to the previous lens, only the vertical light transmitted. A second receiving lens that is oriented the same as the filtering lens will reject the opposite polarization and pass only the desired polarization. The selectivity of the antenna in a satellite system using horizontal/vertical polarizing is similar to the light corollary.

Antenna pointing error, or in other words, the receiving antenna angle misalignment, degrades isolation by the factor 20*LOG (angle of misalignment).

In addition to horizontal and vertical types of polarization, there are right-hand and left-hand circular polarizations where a given signal occupies both vertical and horizontal polarization simultaneously, the difference being the sequencing between the vertical and horizontal polarizations. The vertical signal lags or leads the horizontal in both time and physically in space to determine the direction of the polarization.

After being depolarized at the antenna, the signals are converted to electrical representations denoted herein as signal A and B, where A is the electrical signal with the majority of the signal being originally right-hand polarized and B is from the left-hand polarized signal. Or equivalently, in a separate system, signal A is the electrical signal with the majority from a horizontal polarization and B is from a vertical polarization.

During times of intense raining (rain fade), attenuation increases and isolation between right and left-hand polarized signals degrades further.

Removal of the cross contamination between the two signal polarizations is needed to correct for the degradation of isolation occurring during transmission and reception.

In addition to cross contamination between signal polarizations, signal channels can experience interference from other sources. An outdoor unit may incorporate two or more LNBs to receive signals from multiple satellites positioned in different orbital slots. The directivity of the receiving antenna focuses the signal primarily from one satellite to one LNB. The radio frequency (RF) or intermediate frequency (IF) signals from channels that occupy overlapping frequencies from other satellites can cause interference. This can be called cross-satellite interference or leakage. Interference can come from other sources in the receiving unit. The interfering signal may be from transponder channels that are aligned with the wanted signal or that have a frequency offset.

The LNB output drives an indoor unit, which can be a set-top, media center, or other device that tunes, demodulates, and decodes the video programs.

Further processing of the desired signal can be adversely affected by unwanted interference from same satellite cross polarization interference or interference by a signal from another satellite. There exists a need for a cost effective means of canceling the effects of interfering RF or IF signals present in a received satellite signal.

SUMMARY OF THE INVENTION

The present invention is a method and apparatus for canceling the interference between two or more signals received by a satellite receiver. The signals processed for interference cancellation can be two signals experiencing cross polarization interference, signals that experience interference from other satellite signals, or a combination of both sources of interference. All signals experiencing mutual interference are received simultaneously and each received signal is also a potential source of interference to the other signals. Gain and phase are applied to the received signals and the gain and phase adjusted signals are combined with the other signals to result in cancellation by subtraction of interfering signals from interfered signals. The determination of the gain and phase values needed to cancel out the interference can be achieved by various methods, for example, using carrier-to-noise ratio (C/N) as an indication of the interference level. Different methods are presented that can be used to find the optimal gain and phase to be applied to the interfering signal that maximize the cancellation of the undesired signal, thereby minimizing the interference.

In one embodiment of the invention, a calculation is made of the actual power level of the interference present in the desired signal. The gain and phase in the cancellation circuitry are adjusted to cancel out the interference. This method measures the C/N at two different power levels for a predetermined number of phases. The data is interpolated to determine the correcting phase and amplitude values needed to achieve the highest C/N. The highest C/N corresponds to the minimum amount of interference.

A second embodiment of the invention applies a predetermined gain to the interfering signal and steps through a selected group of phase values while coupling the interfering signal to the interfered signal. The phase value that resulted in the maximum C/N is then used to set the phase of the cancellation circuit. The gain applied to the interfering signal is then adjusted over a range of values to vary the amplitude of the canceling signal. The amplitude value that resulted in the highest C/N is then used to set the gain of the cancellation circuit.

Carrier-to-noise ratio is measured by the receiver demodulator. The invention is cost effective because it utilizes existing demodulators in a set top box or other device to determine the C/N. A control unit determines the correct gain and phase settings for maximum interferer cancellation based on the C/N data from the set top box. The control unit can reside in either the outdoor unit or in the set top box.

When the received interfering signal is coupled to the interfered signal path, the coupled signal must be coherent with the original interfering signal in order for cancellation to occur. If two received signals are downconverted by mixers driven with asynchronous local oscillators prior to the cancellation circuitry, the coupled and original signals will not be coherent. A coherency restoration circuit corrects the coherency problem. In one approach, the coherency restoration circuit mixes the interfering signal with the same LO as used by the interfered signal path. In an alternate approach, the coherency restoration circuit shifts the frequency of the coupled signal by the frequency error introduced by the mixer process to restore coherency between the coupled signal and the original interfering signal.

DETAILED DESCRIPTION OF THE INVENTION

Figure 1:
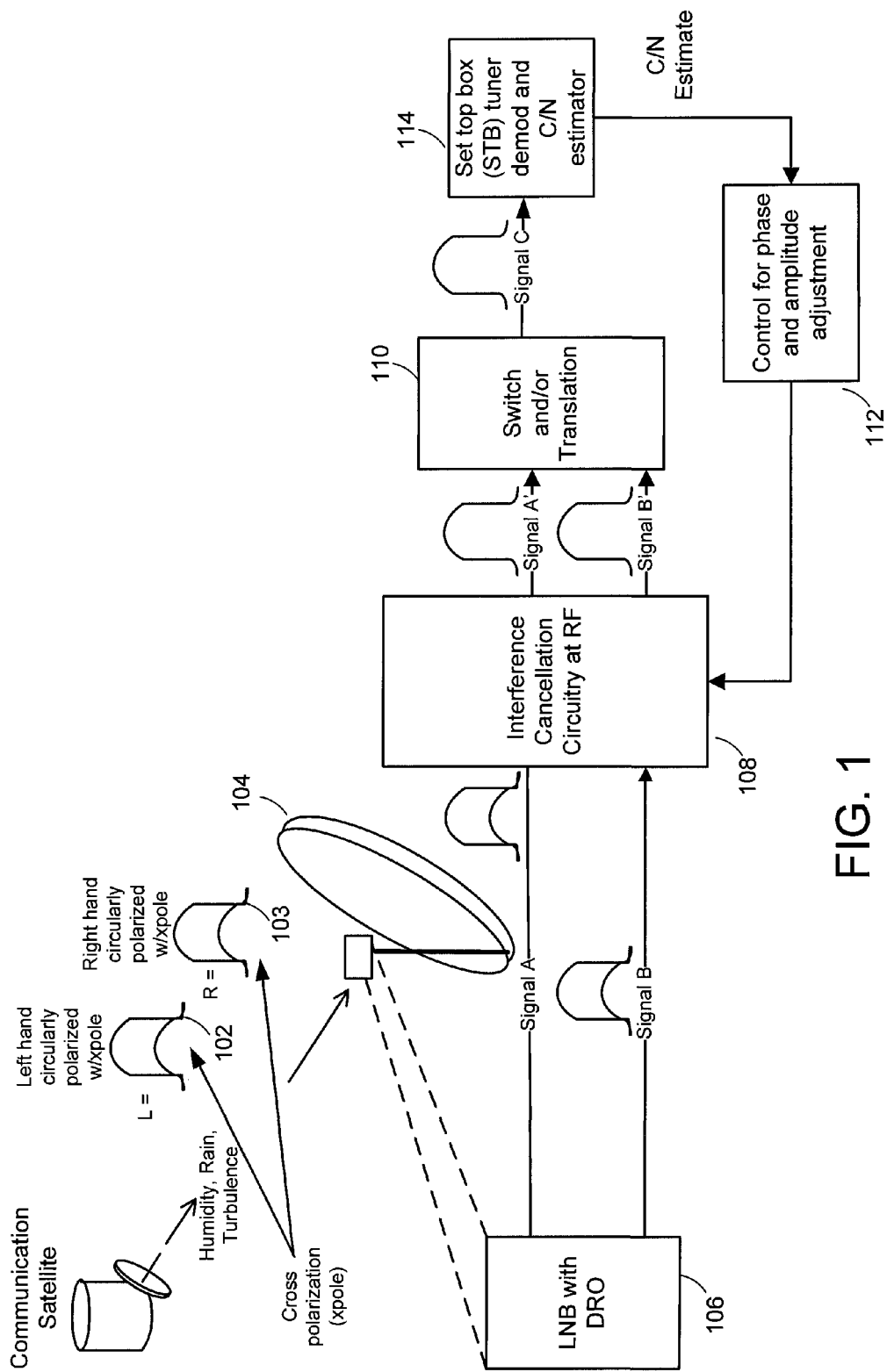
FIG. 1 shows a satellite receiving system with cross pole cancellation according to the present invention.

The cancellation circuit of the invention accepts two signals that are affected by cross polarization or cross-satellite interference. An A and a B signal path are provided. Each signal path subtracts a signal driven through an adjustable phase shifter and adjustable gain circuit from the other signal path. The phase and gain are set to cancel the signal from the other path. Signal adding or signal combining is equivalent to achieve signal subtraction by appropriately phasing the signal to be subtracted.

In order for the cancellation method to work, the signal used for canceling and the signal to be canceled must be mutually coherent and at the same frequency. This will ensure that the phase opposition is independent of time and the cancellation is maintained continuously. Coherency can be lost by a frequency conversion process. If the cancellation is made prior to any frequency conversion (herein referred to as "on-frequency" processing), the interfering and canceling signals are coherent, thus enabling the cancellation method. This is true regardless where the interference comes from cross-polarization, cross-satellite, or from any other source. Even with the frequency conversion, the coherency is maintained if the same frequency conversion occurs on the received interfering signal and the interfered signal when coherent local oscillators are used. This is the case if the same oscillator is shared, or if different oscillators of the same frequency which are phase-locked to the same reference source are used. If non-coherent oscillators or coherent oscillators of different frequencies are used, before the cancellation method can be applied, the coherency must be restored. The method of restoring coherency prior to cancellation is discussed later.

The proper phase and gain needed to achieve cancellation is derived from carrier-to-noise (C/N) measurements made in a remote device, such as the set-top box (STB) or integrated receiver decoder (IRD). By using the existing demodulators located in the remote device, the cancellation method presented is cost effective. The cancellation can be adaptive by monitoring the C/N and adjusting the gain and phase to maintain maximum C/N. Alternatively, the C/N measurement can also be made at installation by an installer tool that has the capability to sense C/N or measure other indications of signal quality.

The level of cross polarization or other interference is determined using an interpolation method by measuring C/N at different phase settings and at different power levels of the interference cancellation circuit. Another approach in determining the needed correcting parameters is to use an iterative approach such as the gradient method. The necessary correcting parameters are therefore calculated and applied to the programmable phase and gain in the cancellation circuit to remove the cross polarization or interference. Additionally, any inherent amplitude inaccuracy in the phase shifter is removed. The interference cancellation circuit can be located in an outdoor unit (ODU) that is in communication with a STB that makes measurements and also receives the corrected signals.

In another embodiment of the invention, a different method (herein referred to as the direct method) is applied when determining the necessary correcting parameters. This method avoids the complex calculations of the interpolation method described previously. The alternate path signal B is injected at a predetermined power level below the level of the primary signal and C/N is measured at each phase step to determine the phase that results in the best C/N. The phase of the alternate path signal is set to that best phase setting and then the power is adjusted up and down to a power level that achieves the best C/N. The resulting phase and level settings provide maximum canceling of the unwanted interference signal.

The approach of injecting a specific phase and level of an interfering signal from another signal path can be extended to several potentially interfering signal paths. One adjustable phase and gain path taps each interfering signal path and injects a controlled level of signal into the corrected path. Measurement of C/N or other indication of quality is made to determine the best phase and gain of each signal path separately. Interference caused at any point in the path up to the point of measurement can be corrected.

In scenarios where the cancellation is to be achieved simultaneously at different frequencies within the operating range, for example to optimize reception of a multiplicity of transponders occupying a relatively wide bandwidth or the entire band, a delay (electrical or time delay of the signal, as opposed to phase shift, often called a "phase delay") adjustment may be needed in addition to the phase adjustment. Typically, with phase adjustment only, the optimum phase for cancellation can be obtained only on a single frequency or in a narrow band of frequencies. Outside of a narrow band of frequencies, the phase of the signal used for canceling and the phase of the signal to be cancelled would diverge from each other. It is well known that phase shift is proportional to frequency, with delay being the constant of proportionality. Therefore, in receiving a wide band of frequencies, signals at large frequency differences will have different phase shifts prior to reaching the point of interference cancellation, unless the time delays of the two paths are matched at these frequencies. If the phase value used for cancellation is determined at one of the frequencies in the band, then the phase value would not be correct for the other frequencies in that band, again unless the time delays are matched at all frequencies. Furthermore, the delay itself may not be constant over the band, i.e. it may exhibit some variability across the band. This is referred to as a "group delay" or a "group delay profile". Typically, the narrower the relative or fractional bandwidth (defined as the bandwidth divided by the center frequency of the band), the lower the group delay profile, hence easier to match delays. At higher frequencies, the fractional bandwidth tends to be narrower. For example, at Ku band frequency of 12 GHz, a 500 MHz signal range is only about 4% fractional BW, while the same 500 MHz range at L band frequency of 2 GHz would represent a 25% fractional BW. Typically, it would be easier to match delays across the 4% BW than across the 25% BW.

In the present invention, to achieve cancellation across the entire band, a programmable delay element is added and delay adjustment is performed. To adjust the delay, the C/N of two or more channels is measured, preferably including the two channels at either edge of the band. The delay and the phase shift are adjusted, one at a time, until the best C/N is achieved on the measured channels. By utilizing a time delay adjustment in addition to the amplitude and phase adjustment, the optimization of cancellation can be determined on the entire band simultaneously rather than on one optimization per channel (i.e. transponder channel). Depending on the group delay profile and the level of the achievable match of the delays, the depth of interference cancellation may vary across the band. A true optimum may not be achieved for all channels, but system complexity is reduced by using one path for the entire frequency band, still resulting in significant performance improvements.

The interference cancellation circuitry and technique can also be used to cancel interference from a signal from another satellite, referred to as "cross satellite" interference. The signal A from a first satellite may contain interference signal B from a second satellite. Cancellation of signal B in signal A is performed by subtracting an attenuated and phase shifted version of the original signal B from signal A.

Traditionally, outdoor units have a LNB which will provide a first frequency downconversion of the signal. One embodiment of the present invention is to provide only one downconversion and this downconversion would occur after the interference cancellation circuitry. This embodiment would ensure that coherency of the signals (from one satellite) is maintained and it results in a simplified system. Another embodiment of the present invention is to apply the interference cancellation after the frequency conversion, provided that the frequency conversion is performed in a coherent way. If the coherency is not preserved in the downconversion process, yet another embodiment of the present invention first restores the coherency and then performs the interference cancellation.

FIG. 1 shows a satellite receiving system with cross pole interference cancellation. The outdoor unit is comprised of antenna 104, LNB 106, interference cancellation circuitry 108, switch and translation circuitry 110, and control unit 112. In the outdoor unit (ODU), an antenna 104 receives the two polarization signals 102 (L) and 103 (R) and feeds a low noise block converter 106 (LNB) that amplifies and downconverts the high frequency satellite signal to a lower intermediate frequency (IF) signal. The IF signal is commonly in 950 to 1450 MHz or a wider 950 to 2150 MHz range, which is still considered radio frequency (RF). Both polarization signals are available at the LNB output. In this example, the local oscillator (LO) is a DRO type (dielectric resonator oscillator), typically used in LNBs. An undesirable portion of signal A is present in signal B, and an undesirable portion of signal B is present in signal A. An interference cancellation circuit 108 is used to vary the phase and gain of the two polarization signals feeding into the other signal. A switch 110 is present in the ODU to couple any of the LNB outputs to any remote device, in this example, a set top box 114 (STB) is shown. The STB 114 receives the IF signal and demodulates and decodes the signal into one or more TV channels. The STB has circuitry to measure the carrier-to-noise ratio (C/N). Control unit 112 can be located in the ODU or in the remote device. The control unit, which can include a microprocessor central processing unit (CPU), adjusts the cancellation circuitry 108 until magnitude and phase of the cross pole signal results in maximum C/N.

Alternatively, the C/N measurement can be performed in the ODU or anywhere else in the system, or be performed using a C/N measurement with an installer tool at installation. C/N can be measured directly using well-known techniques. One technique is to measure the error radius of the received data samples around the ideal constellation points relative to the radius of the constellation. For example, in a QPSK signal, the ideal, nominal, or center of the four constellation points lie on a circle and each received constellation point will have a distribution of values around the ideal point. The error radius can be defined, for example, as the one standard deviation radius around the ideal points. Alternatively, the mean square error of a group of constellation points can be calculated as a measure that is representative of C/N. C/N can be measured indirectly through measurement of the bit or packet error rate of the demodulated signal.

Figure 2:
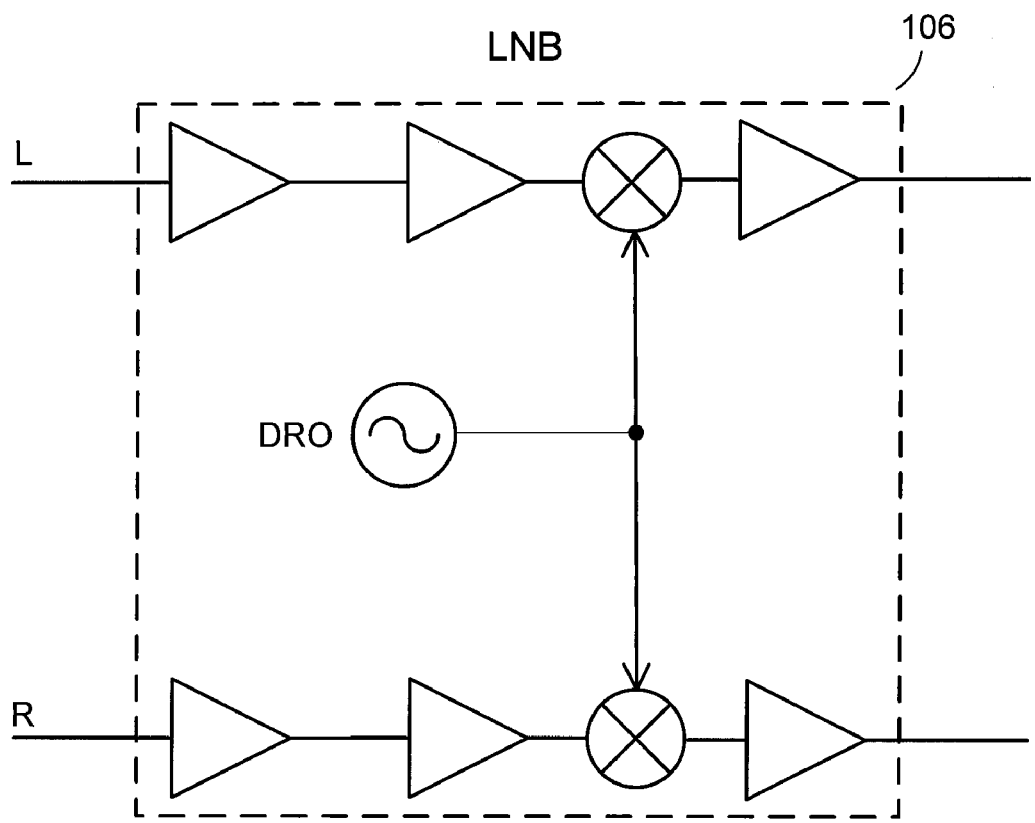
FIG. 2 shows a typical LNB circuit for use with the present invention, using one oscillator shared between the two paths, preserving the coherency of the converted signals.

FIG. 2 shows a conventional LNB circuit 106 for use with the present invention, using one LO shared between the two paths, a typical arrangement for saving cost and reducing complexity. A side benefit of sharing the LO is that the down-converted signals remain coherent, thus simplifying interference cancellation when performed post-mixing. If the LO is not shared and non-phase locked oscillators used instead, the signals need to be made coherent for optimal interference cancellation, as discussed below.

Figure 3:
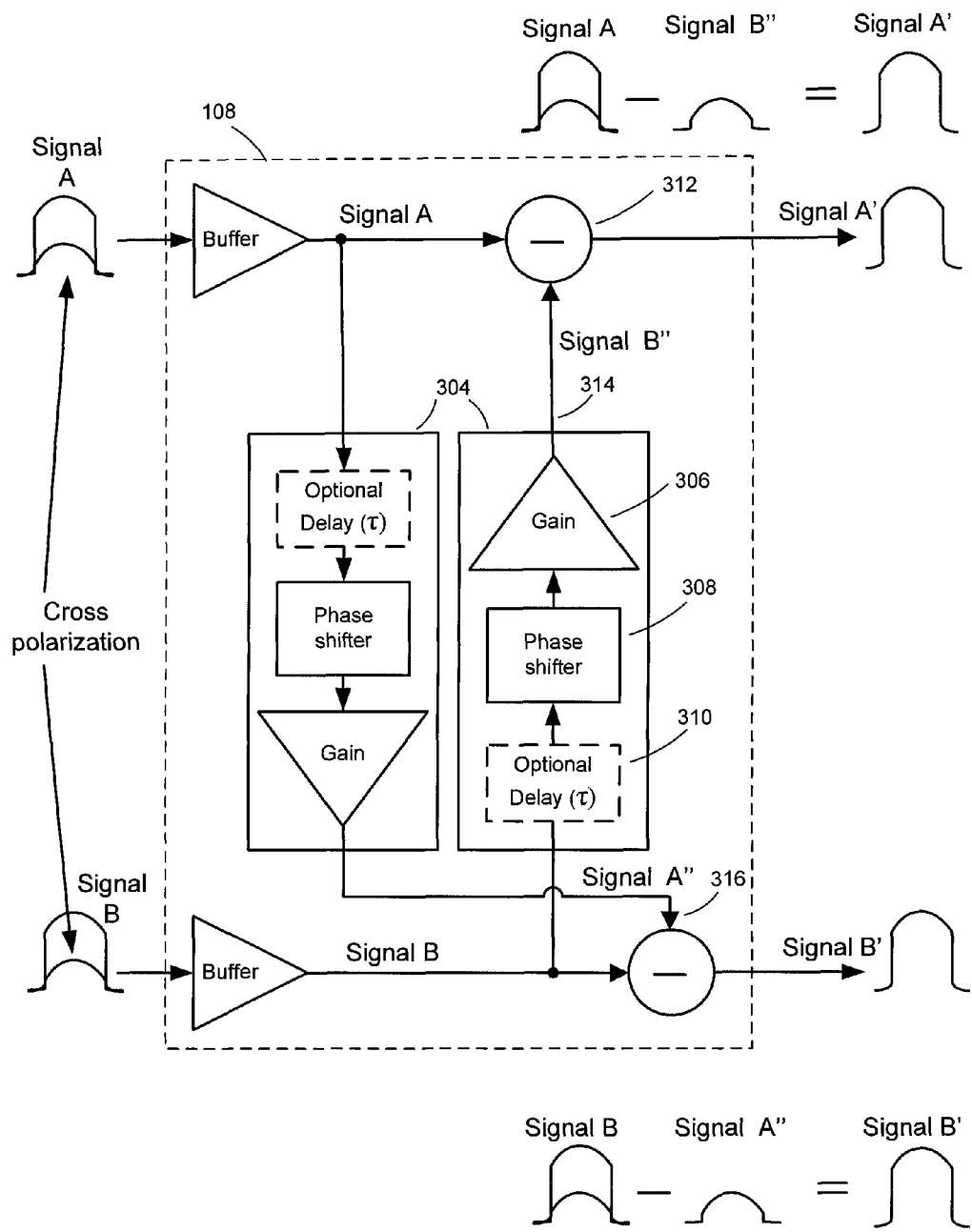
FIG. 3 shows an interference cancellation circuit for use with the present invention when the signal used for canceling and the signal to be canceled are coherent.

FIG. 3 shows an interference cancellation circuit 108 for use with the present invention for cross pole interference cancellation. Adjustable phase shifter 308 and adjustable gain 306 are applied to signal B and the resulting signal 314 (B") is fed into the A path. Likewise, phase shifting and gain are applied to signal A and the resulting signal 316 (A") is fed into the B path. When used as a cancellation circuit, the phase and gain are set to cancel the cross polarization signal present in the received signal by setting the gain to match the amplitude and setting the phase to 180 degrees from the contaminating signal, which results in subtraction or cancellation. When used in the measuring mode, the phase and gain are set to test the level of contamination. In one embodiment of the invention, the STB estimates the C/N ratio and sends this value for processing by the control unit which drives the interference cancellation circuitry 108 typically located in the ODU. Communication between the STB 114 and the ODU can use well-known techniques for communicating; including FSK control or more advanced and commonly used Digital Satellite Equipment Control (DiSEqC).

Cancellation circuitry 304 shows an optional time delay (τ) adjustment 310. The use of the time delay adjustment depends on system requirements including the required bandwidth of the input signal.

The phase shift, the gain, and the time delay parameters are adjustable and the cancellation circuit may be implemented such that the parameters are programmable or changed by well-known analog or digital circuits.

Figure 4:
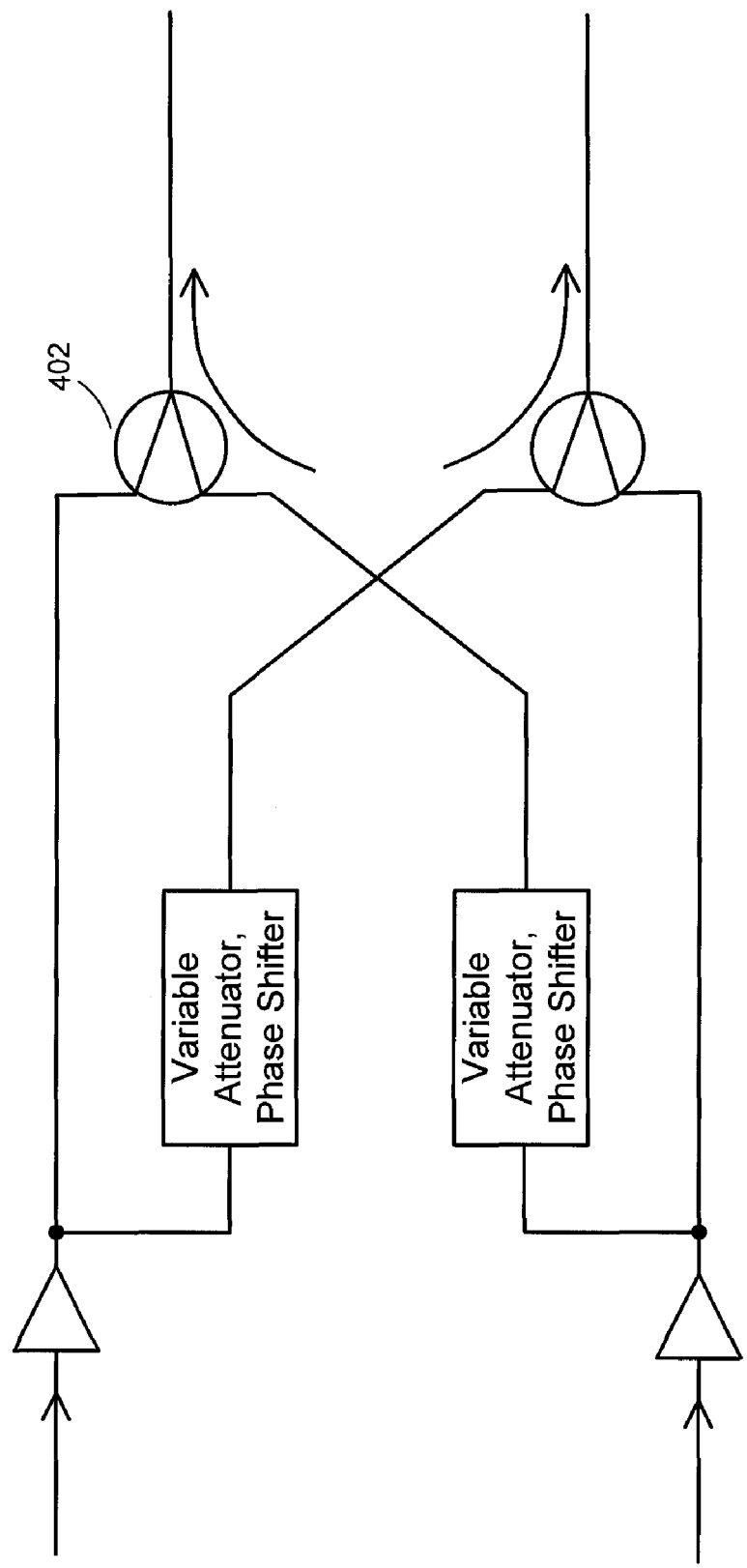
FIG. 4 illustrates the present invention using passive elements such as a variable attenuators and directional couplers.

FIG. 4 illustrates implementing the interference cancellation circuitry 108 of the present invention using passive elements. Depending on system requirements, active components of FIG. 3 can be replaced with passive devices. Because the signals to be subtracted (314 and 316) are normally expected to be small in amplitude, and at a lower level than the received interfering signal, the gain circuitry can use a passive variable attenuator. The subtraction circuit 312 can be performed using a well-known transmission line directional coupler 402. Directional couplers can be realized in microstrip, stripline, coax, or waveguide techniques, or using transformers.

Figure 5:
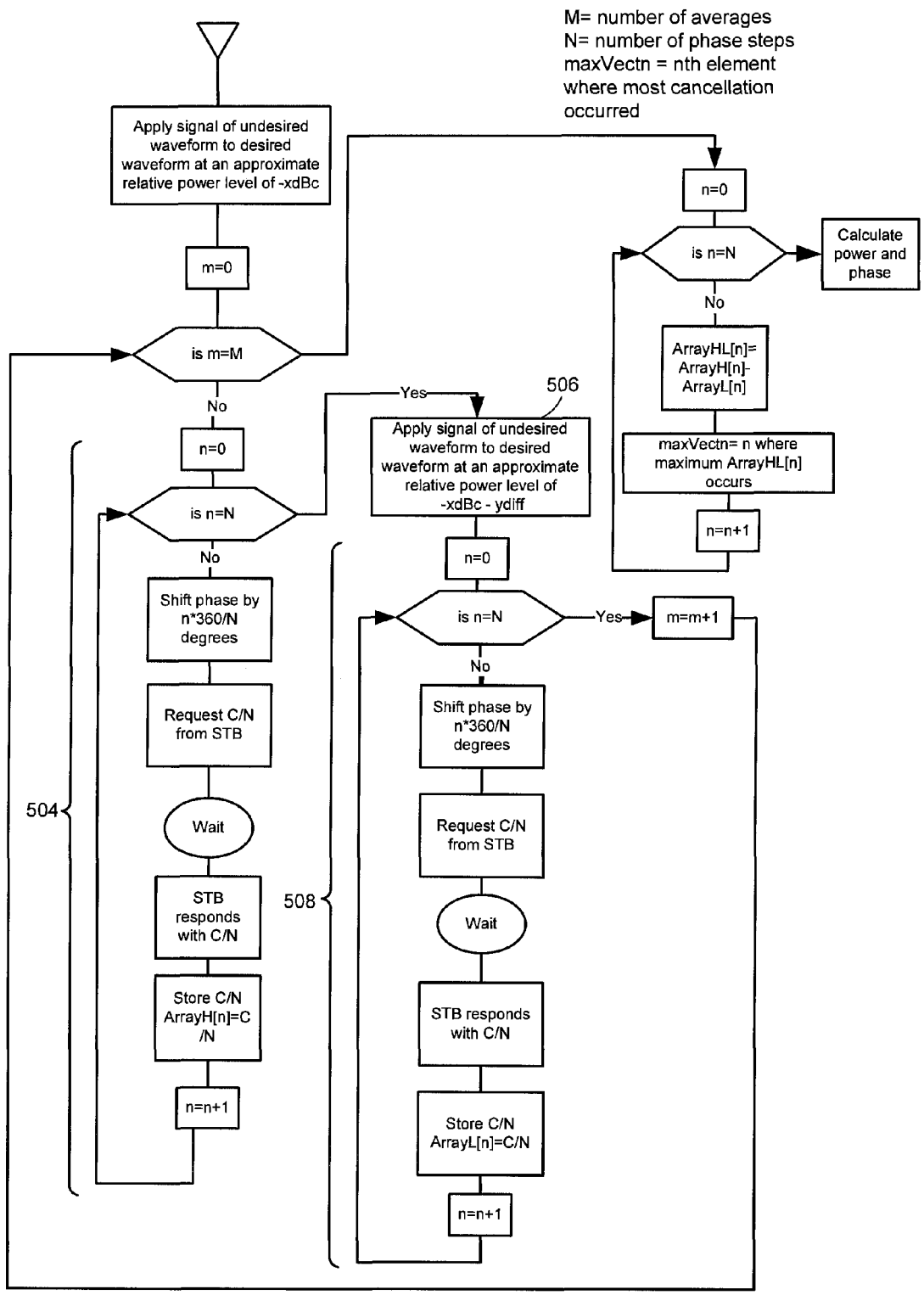
FIG. 5 shows the steps to measure the phase and amplitude level of cross polarization or other types of interferences.

FIG. 5 shows the steps of an interpolation approach in determining the phase and amplitude level of cross polarization or interference. If the cancellation method includes the adjustment of time delay in addition to amplitude and phase adjustment, the method shown in the figure and describe below can be expanded to include the third parameter of time.

A predetermined gain/amplitude is applied to the unwanted (interfering) signal, for example, the power level may be chosen to be 10 dB less than the desired (interfered) signal. At this predetermined power level, the phase is stepped through a number of discrete phases (504). A second power level is applied (506) and the phase is stepped through the range (508). An averaging loop (using M) is shown so that several measurements can be taken at each phase setting and power level. The order of stepping phase and power can be reversed, where the power is switched between the two levels at each phase setting. Averaging can be taken repeatedly at one setting or on subsequent cycles of the stepping process. The average can be obtained by summing new readings with the accumulated stored value.

The steps are as follows:
1. Feed signal B into signal A at approximately 10 dB attenuation (power 1).
    a. Measure C/N and record.
    b. Rotate phase by 1 phase step.
    c. Repeat steps 1a to 1b until all phase steps are exercised.
    d. Increase attenuation by pdiff dB (resulting in power 2). Pdiff is the predetermined power level step size.
    e. Measure C/N and record
    f. Rotate phase by 1 phase step
    g. Repeat 1e to 1f until all phase steps are exercised.
2. Determine phase step where the maximum difference of C/N occurred between power 1 and power 2 and record the values of power at the phase step, p1max and p2max for that phase step. The value of p1max is the power in dBc at the first power level when the phase is adjusted to achieve the maximum constructive interference; p2max is the power in dBc at the second power level.
3. Find phase step where the minimum difference of C/N occurred between power 1 and power 2 and record the values of power at the phase step, p1min, and p2min for that phase step. The value p1min is the power in dBc at the first power level when the phase is adjusted to achieve the maximum destructive interference; the value p2min is the power in dBc at the second power level.
4. Determine the value of perrmax. Inherently in the system, there will be gain/attenuation differences between the different phase steps. This difference will need to be calculated from the p1max, p1min, p2max and p2min values. The resulting error will be called perrmax. The value perrmax is defined as the power difference in the phase shifter due to the manufacturability of the phase shifter. In broadband phase shifters, the amplitude is not constant across phases; in this invention, this inaccuracy is compensated by the value perrmax (in dB).
5. Calculate power of signal B in signal A using the ptest function shown in Equation 1 below.

Since the relative power of signal B in signal A is not precisely known, it will need to be calculated using p1max, p1min, p2max, p2min, and β. The value β is defined as the square root of linear equivalent value of perrmax (perrmaxLin). The result of the calculation will be the power of the undesired signal (signal B) relative to desired signal (signal A); this will be called ptest. Equation 1 shows the formula to calculate ptest (the linear equivalent value of ptest is denoted as ptestLin).

$$ptestLin = -((\beta \cdot \alpha)(A-B) - \alpha^2(C-A) - \alpha(B-A) + D-B)/E \quad \text{Equation 1}$$

Where $$\beta = \frac{1}{2\cdot\alpha\cdot B - 2\cdot\alpha\cdot A}\cdot(\alpha^2\cdot A - \alpha^2\cdot C - B + D - F)$$

α=the inverse of the square root of the linear equivalent of pdiff.
A=p1minLin where p1minLin is the linear equivalent of p1min.
B=p2minLin where p2minLin is the linear equivalent of p2min.
C=p1maxLin where p1maxLin is the linear equivalent of p1max.
D=p2maxLin where p2maxLin is the linear equivalent of p2max.

$$E = \alpha\cdot(-\beta + (\beta\cdot\alpha^2) + \alpha^2 - 1)$$

$$F = (\alpha^4\cdot A^2 - 2\cdot\alpha^4\cdot C\cdot A - 2\cdot\alpha^2\cdot A\cdot B - 2\cdot\alpha^2\cdot A\cdot D + \alpha^4\cdot C^2 - 2\cdot\alpha^2\cdot C\cdot B - 2\cdot\alpha^2\cdot C\cdot D + B^2 - 2\cdot B\cdot D + D^2 + 4\cdot\alpha^2\cdot B\cdot D + 4\cdot\alpha^2\cdot C\cdot A)^{\frac{1}{2}}$$

Next, we can calculate the power of the original signal B into signal A (or cross polarization or xpole). Using β, ptest, p1max, p1min, p2max, p2min, as well as pdiff numbers from above, the crosspole power can be calculated.

6. Calculate the power of the crosspole power of signal B in signal A using the crosspole function pxpole. Equation 2 shows the equation for pxpoleLin where pxpoleLin is the linear equivalent of pxpole.

$$pxpoleLin=[(B-D-\alpha^2\cdot(1-\beta^2)\cdot ptestLin)/(-2\cdot(\beta+1)\cdot\alpha)]^2/ptestLin \quad \text{Equation 2}$$

Finally, if needed, we can estimate the power of the noise of the system under test, using β, ptest, pxpole, p1max, p1min, p2max, p2min, as well as pdiff. Equation 3 below shows the equation for pnoiseLin, the linear equivalent of pnoise, reduce to terms using previously found values of pxpoleLin and ptestLin.

$$pnoiseLin=A-(ptestLin^{1/2}-pxpoleLin^{1/2})^2 \quad \text{Equation 3}$$

This process is repeated for the other signal, where signal A is fed into B and measurements are taken. The phase and gain are calculated to cancel the cross polarization of both signals. Cancellation of the cross polarization signal is needed for both signals because one or more set top boxes may be receiving and processing both polarizations simultaneously.

In an alternate embodiment, the C/N does not need to be measured at all possible phases. For example, after an initial optimum phase for correction is determined, a narrower range of phase steps centered on the initial optimum phase value can be used to track changes in the optimum phase value. A new search over a suitable range can be initiated after installation, or channel change, or periodically, or at a scheduled time when the system is not being used.

Previous correction values and ranges of values can be stored to set upper and lower bounds for the range of phases needing to be searched for optimum correction. Additionally, the sequence for cross pole cancellation can be triggered when a degradation of a predetermined or adaptive amount is detected.

The cancellation sequence can degrade the live signal. Performing the cancellation procedure during channel changes would minimize the disturbance caused by the cancellation procedure.

During a maintenance period of the cross pole cancellation, measuring the optimum phase and amplitude is done after the cross pole power is high enough to be detected and measurable as a change in C/N. Upon having this measurement available, the previous canceling cross pole signal can now be used to determine the exact amplitude and phase of the present cross pole degradation. This may be achieved by rotating the phase and monitoring constructive and destructive interference, then changing the power by some known amount and measuring again at the constructive and destructive phases and re-performing the math associated with the determination of the new cross pole phase and relative magnitude. The key here is not to degrade the C/N by any more than is needed while the system is operating. From these measurements, the correct phase can be calculated and applied, then the signal level can be increased while measuring for maximum cancellation of the cross pole signal.

Another approach, herein referred to as the direct method, determines the correct phase and gain for canceling the interfering signal by directly measuring the C/N for each interferer phase setting, then setting the phase to the optimum value and measuring the C/N for various interferer gain settings to set the optimum gain. Preferably, the phase is set with a test power level from the unwanted interfering path set below the wanted signal level, for example at −10 dBc relative to the wanted signal. The phase is swept across all potential phase setting to determine the phase that causes maximum cancellation, for example as measured by C/N in the set-top box. The phase is then fixed at that level and the gain is adjusted up and down to the level that causes maximum cancellation. This direct measurement approach avoids complex calculations to derive phase and gain values.

Figure 6:
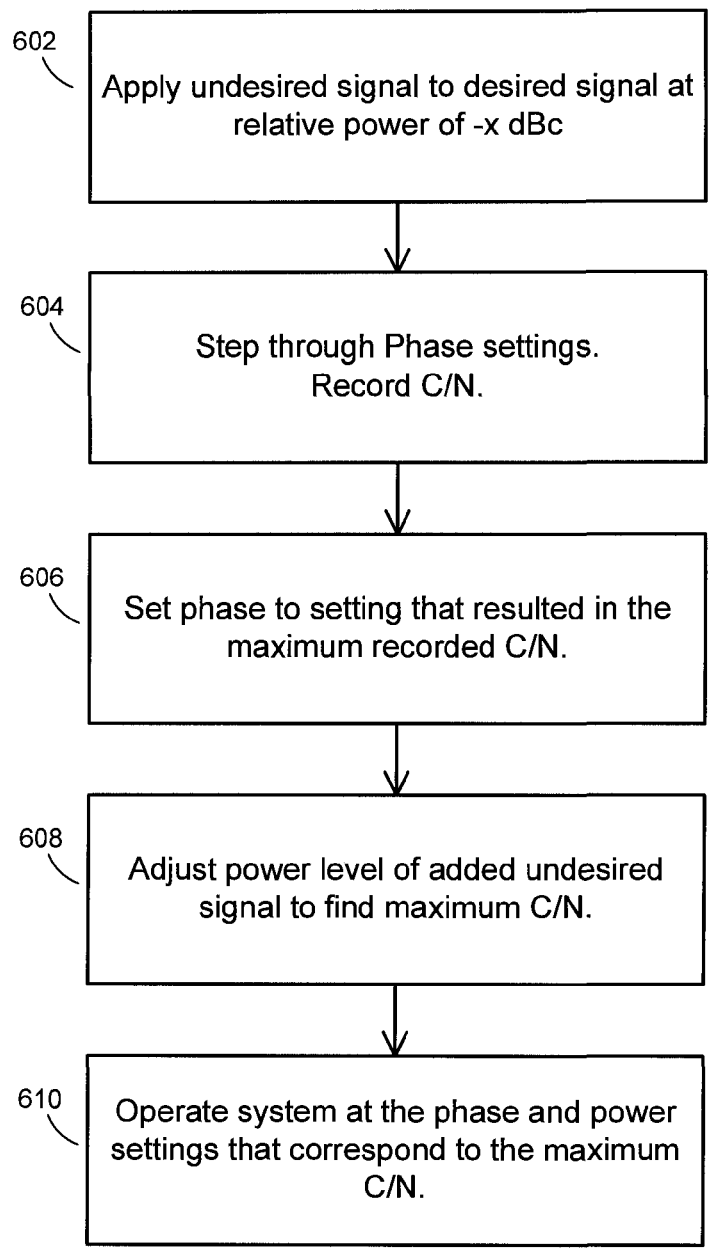
FIG. 6 shows the steps to set the phase and amplitude for cancellation of the interfering signal using the direct method.

FIG. 6 shows the steps to set the phase and amplitude for cancellation of the interfering signal using the direct method. The undesired signal is summed with the desired signal, through a programmable phase and gain path, at a relative power level of approximately the expected interference, for example at −10 dBc relative to the wanted signal (602). The phase setting is stepped and C/N recorded at each step (604). The phase is set to the value where the maximum C/N was measured (606), which corresponds to the minimum interference or greatest cancellation. When the injected signal is the opposite phase with the interfering signal, canceling occurs. The power level of the added signal is adjusted to find the maximum C/N (608). The system is operated at the phase and power level that provided maximum C/N (610).

Interference can come from other satellite signals being processed by the ODU or IRD. An ODU with several LNBs, which can be discrete or integrated into one unit, creates one source of interference as several broadband satellite signals from different satellites are downconverted to overlapping frequencies. Interference can be introduced at the feed horn, in the conversion process, or other points in the signal paths. One interferer may be dominant and thus require only a single unwanted signal injection path. If more than one interferer is significant, a phase and gain controlled injection path can be provided to inject and cancel multiple signals.

Figure 7:
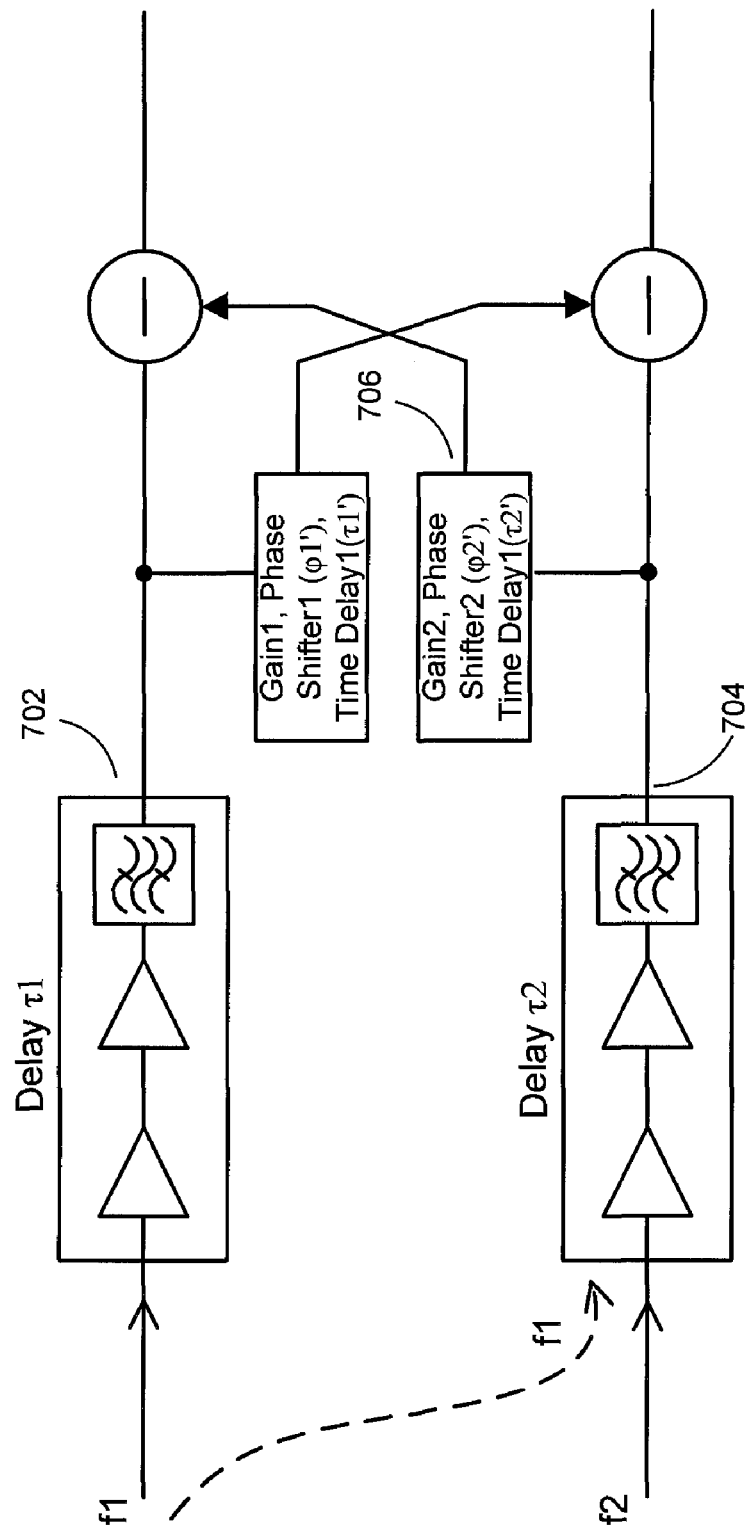
FIG. 7 shows a block diagram of the time delay cancellation procedure.

FIG. 7 shows a block diagram of the time delay cancellation operation. Undesired delays τ1 and τ2 are introduced by the initial amplification and filtering of the incoming signals, for example, in the LNB. Delayed signal output 702 can be shown to be cos [w(t−τ1)+φ1] and output signal 704 can be shown to be cos [w(t−τ2)+φ2] where φ1 and φ2 are resulting phase shifts. The output signal 706 of the cancellation circuitry can be shown as $\cos[w(t-\tau2')+\phi2']$ where $\tau2'$ is the delay after adjustment and $\phi2'$ is phase after adjustment. For optimal cancellation, $(w\tau1)-\phi1$ equals $(w\tau2)-\phi2$ at all frequencies of interest, which occurs only when both the delays and the phases are matched, i.e. $\tau2=\tau1$ and $\phi2=\phi1$. If a wide band of frequencies are to be corrected for interference, the cancellation method is performed using the C/N measurement of at least two channels, preferably the channels at the edges of the band. The delay and phase shifts are adjusted one at a time until the best C/N is achieved on each of the measured channels.

Figure 8:
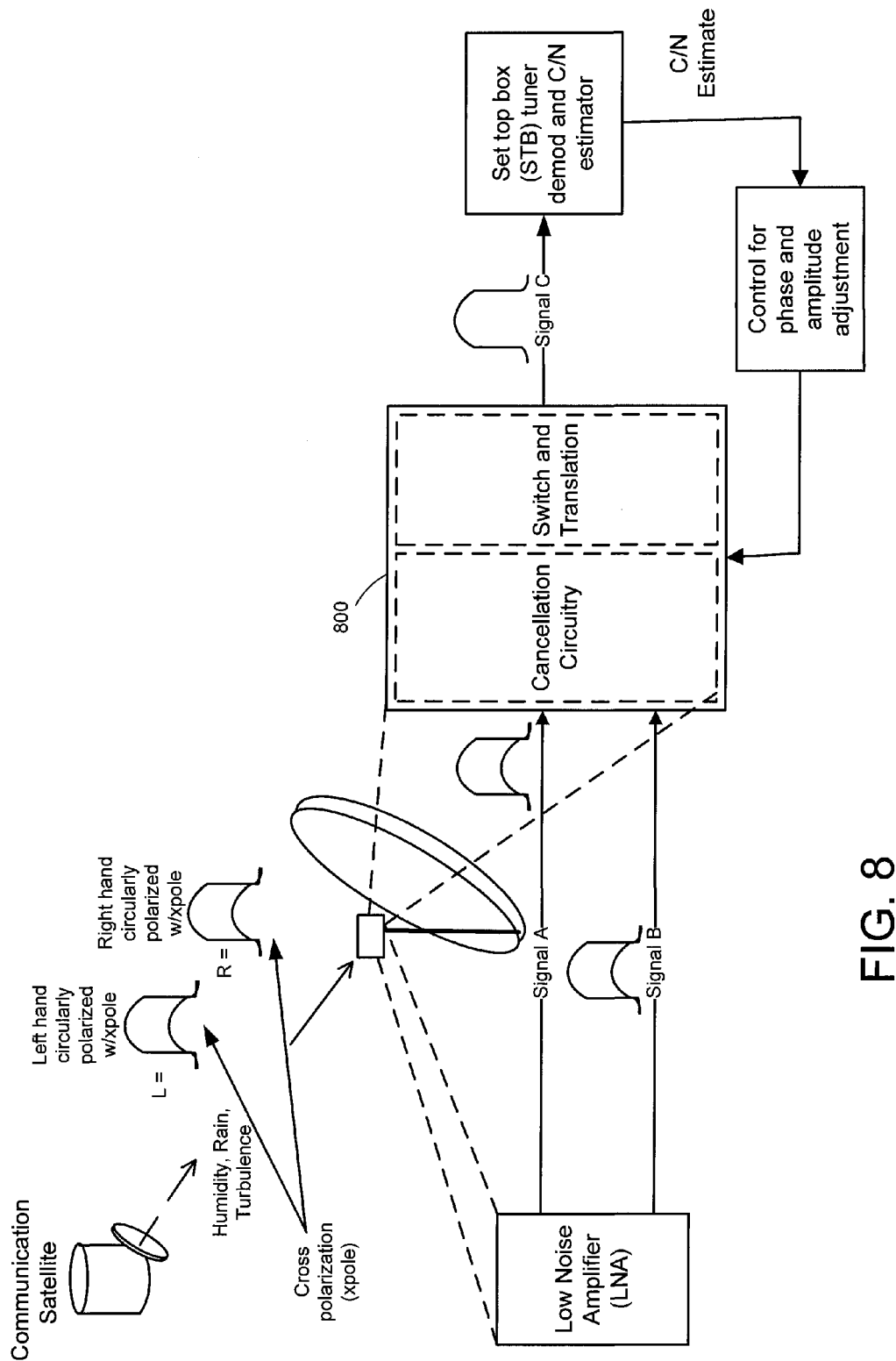
FIG. 8 shows a satellite receiving system using a switching circuit with cross pole cancellation at the received frequency, prior to any frequency conversion using, for example, a circuit as shown in FIG. 9.

FIG. 8 is a block diagram of a two-satellite system using the crosspole cancellation circuit with a high frequency switch and translation circuit 800. In this case, the LNB is replaced with a low-noise amplifier (LNA) so no downconversion is performed prior to the crosspole cancellation. The crosspole cancellation occurs at the original frequency, for example at a Ku-band frequency. After the crosspole cancellation, the signals are then switched and frequency downconverted. The switching is performed at the original frequency of the signal and is herein referred to as 'on frequency' switching. The downconversion can be such that each polarization occupies a different frequency band and the resulting signals can be combined into a single band stacked signal.

Figure 9:
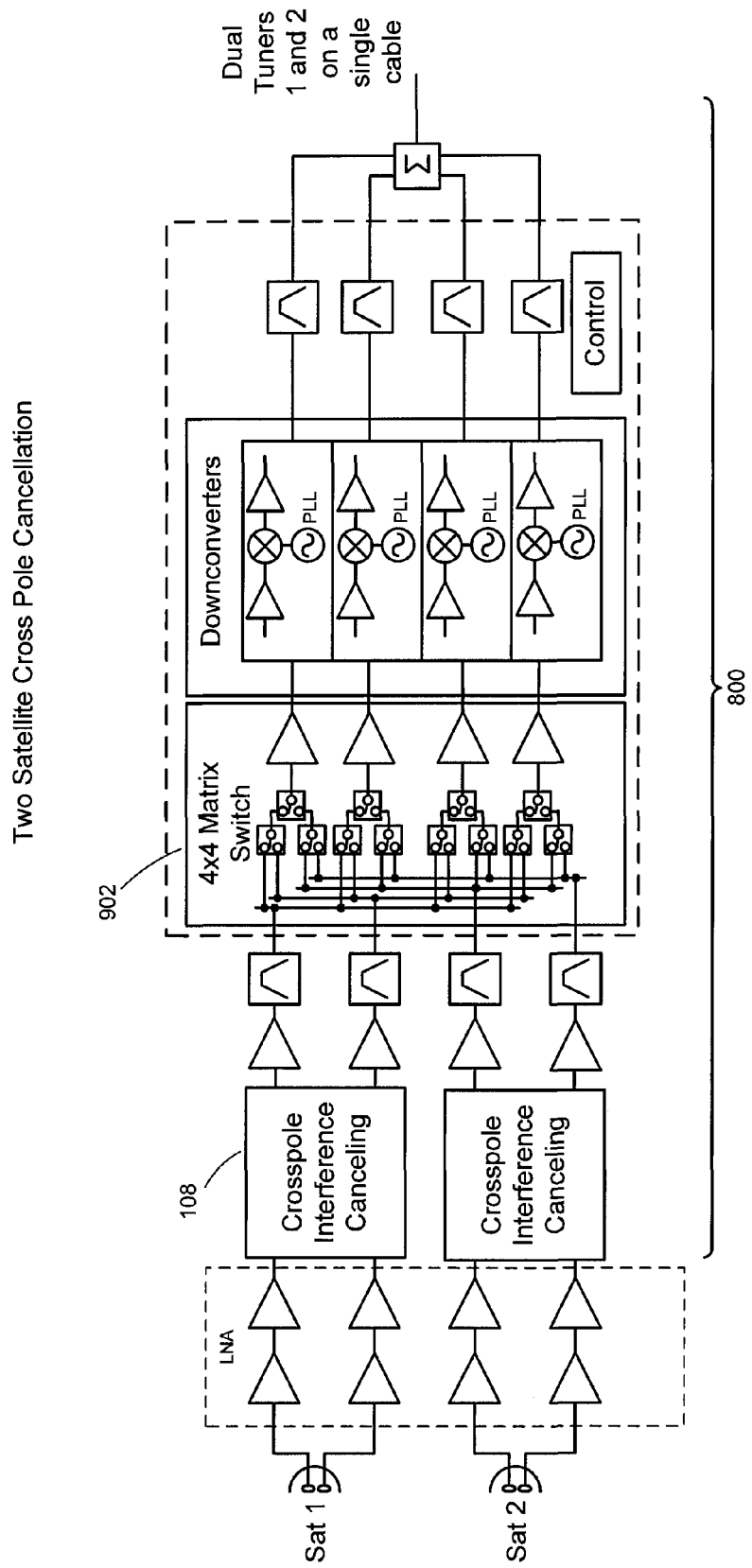
FIG. 9 shows a block diagram of a switching circuit utilizing "on-frequency" cross pole cancellation according to the present invention.

FIG. 9 illustrates the cancellation circuit with the 'on-frequency' switch and frequency translation of the present invention. In this embodiment, the polarized signals are coherent and the cancellation circuit illustrated in FIG. 3 may be used; no coherency recovery is necessary. In this embodiment of the invention, a switch matrix 902 selects two or more signals from among the received signals at the received radio frequency (RF). The selected signals are downconverted and frequency translated, each signal to a different channel frequency. The translated signals are combined to form a channel-stacked signal (CSS). The channel-stacked signal feeds multiple tuners in set top boxes (STBs). Alternatively, the signals can be band-stacked, accomplishing the band-translation system (BTS) in which case simpler filters can be used. A single downconversion step is used, thereby reducing complexity, cost, and phase noise while utilizing on-frequency coherency of the signals for optimal interference cancellation.

Figure 10:
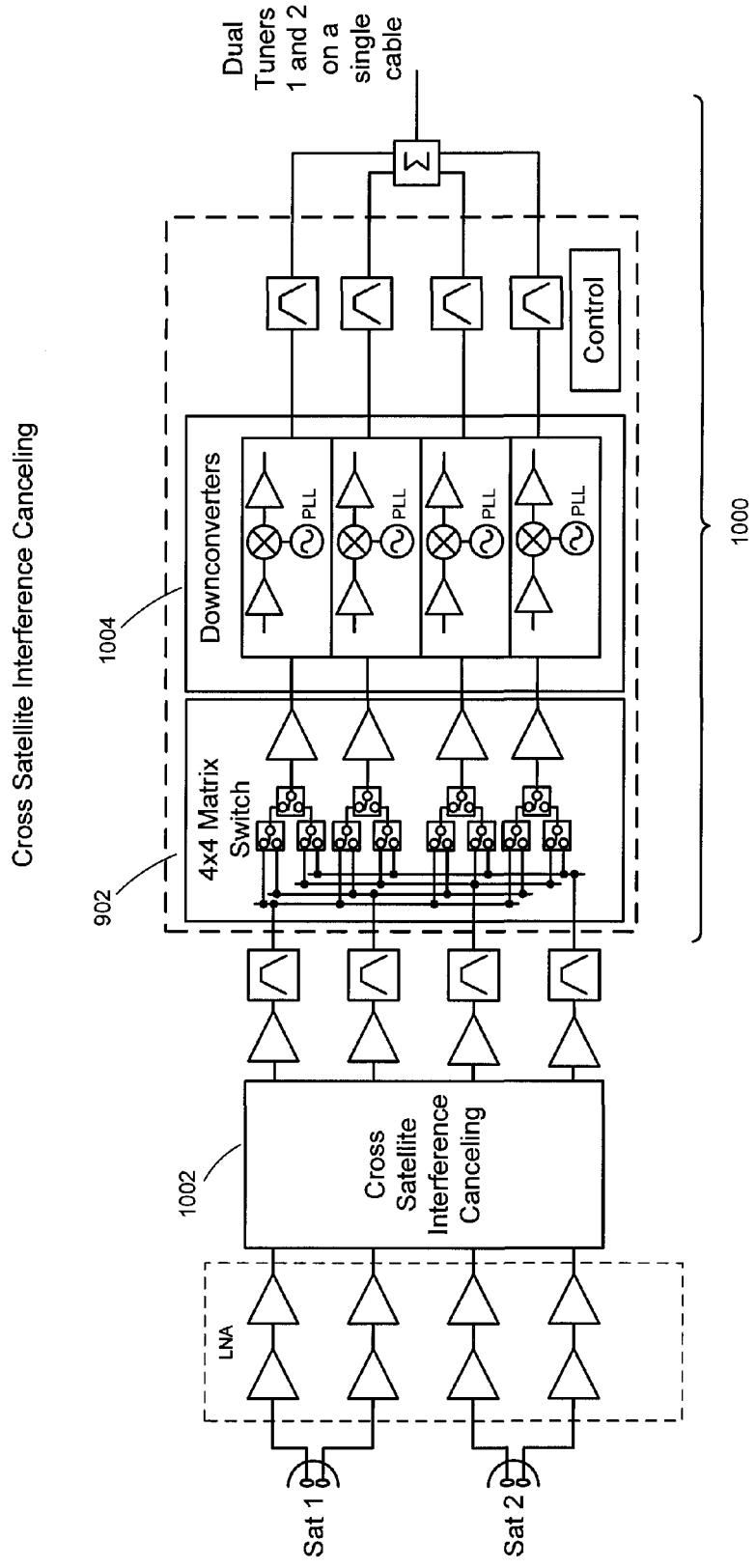
FIG. 10 shows a block diagram of a switching circuit utilizing the interference cancellation to cancel cross satellite interference.

In a system operating with wider bandwidths and without delay adjustments 310, the canceling circuits 108 and 1002 in FIGS. 9 and 10 respectively, would need to be located after the switches in the switch matrix 902, not before the switch matrix 902 as shown in the figures. This would be necessary in order to adjust the optimum phase for the selected channel on each output line. This method would be less efficient, since each output line of the switch would require a separate cancellation circuit with complicated signal routing and switching. If the delay parameter is used during the cancellation procedure, the cancellation circuitry is shared and simplified.

FIG. 10 shows a diagram of a two-satellite system configuration where the inputs of the LNA are the right and left hand polarization signals from two satellites. In this embodiment of the present invention, the interference canceling circuit 1002 is used to cancel the cross satellite interference. The amplified signals are fed into the cross-satellite interference canceling circuit (for example, the circuit 1002 of the present invention shown in FIG. 11). The output of the cancellation circuit is filtered and the output of the filters fed into circuit 1000. Circuit 1000 consists of a matrix switch block 902, a downconverter block 1004, and the necessary control circuitry. The outputs of circuit 1000 can be combined to create a channel or band-stacked signal where a single cable can be used. The single cable output can be then connected to one or more set-top boxes.

Figure 11:
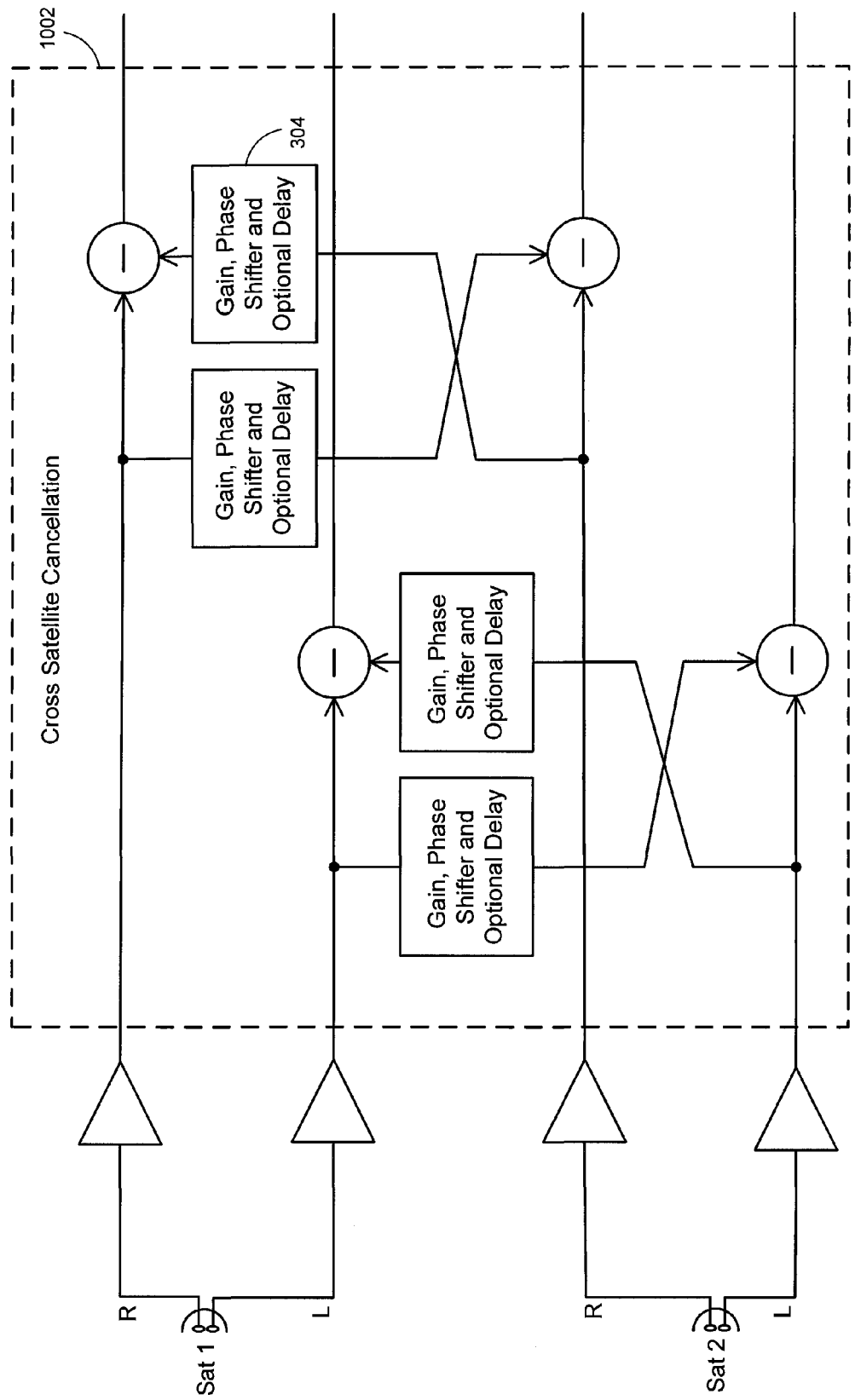
FIG. 11 shows a block diagram of one embodiment of the interference canceling circuit 1002 of FIG. 10.

FIG. 11 shows the block diagram of the interference canceling circuit 1002 of FIG. 10. Coupling is provided from one satellite receiver path to the other.

Figure 12:
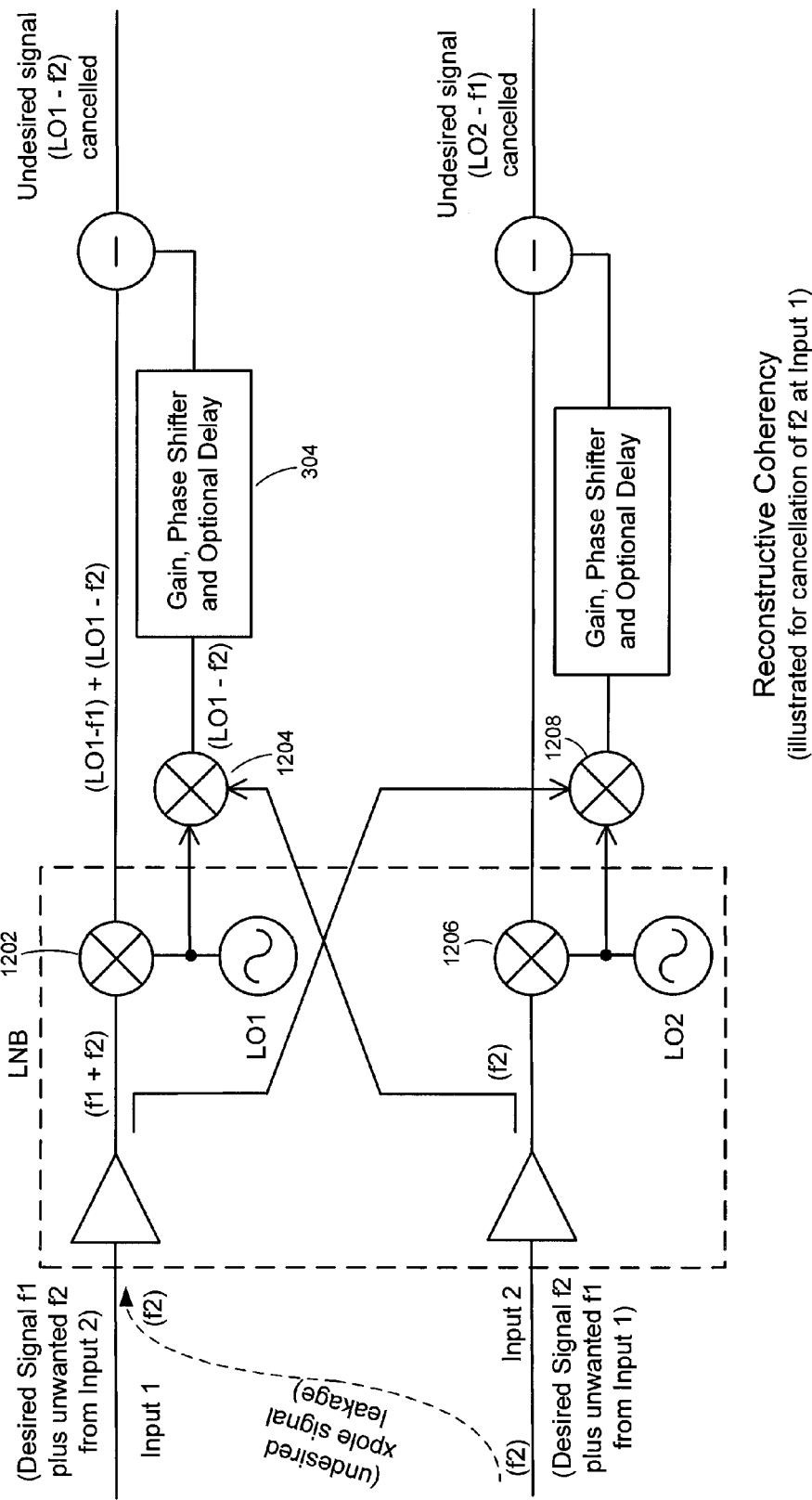
FIG. 12 shows an example of the interference cancellation circuitry when the signals are not coherent and coherency needs to be restored or created.
Figure 13:
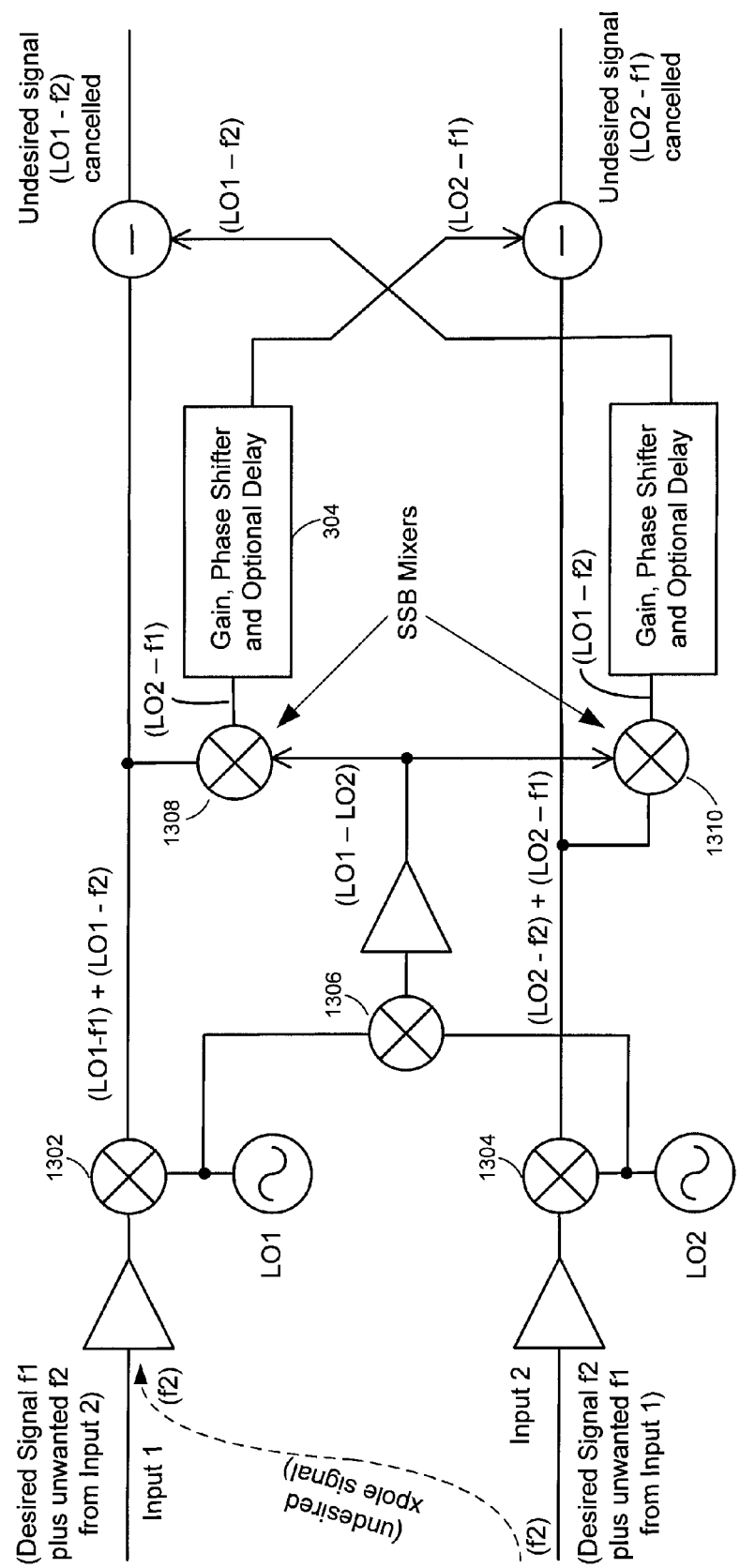
FIG. 13 shows another technique of recovering or creating coherency of the signals for optimal interference cancellation.

FIGS. 12 and 13 illustrate a technique of restoring or creating coherency between two signals prior to the cancellation of the interference. If the signals are downconverted prior to the interference cancellation circuit and separate oscillators that are not phase locked perform the downconversion process, the downconverted signals will not be coherent. By using the methods illustrated in FIG. 12 or 13, the signals will be made coherent and optimal interference cancellation can occur. The same adjustable gain and phase circuitry 304 of FIG. 3 and the same methods as illustrated in FIG. 5 and FIG. 6 can be used to measure and to cancel the interference in the circuit examples of FIGS. 12 and 13.

FIG. 12 illustrates the coherency recovery needed for effective cancellation of signal f2 at Input 1 (and signal f1 at Input 2). Interference f2 is present in signal f1 at Input 1. Local oscillator LO1 drives two mixers, 1202 and 1204. The output of mixer 1202 will contain the interfering signal shifted in frequency to LO1-f2 along with the primary signal shifted to LO1-f1. In order to optimally cancel this signal, the signal f2 at input 2 needs to be made coherent with the signal LO1-f2. This is achieved by mixer 1204. The input to mixer 1204 is signal f2. Mixer 1204 shares the same LO (LO1) with mixer 1202. Therefore, the output of mixer 1204 will contain the signal LO1-f2. Phase shifting and gain (circuitry 304) are applied to the output of mixer 1204 and the output of circuitry 304 and mixer 1202 are subtracted. The determination of the optimal gain and phase settings are determined by the same methods illustrated in FIG. 5 and FIG. 6. The interference of f1 present in signal f2 at Input 2 will be similarly cancelled using mixer 1206 and 1208.

FIG. 13 illustrates another technique for coherency recovery. This technique uses the difference in the LOs at each input to create the LO signal LO1-LO2 to drive the two single-side band (SSB) mixers (1308 and 1310). Downconversion mixer 1302 with LO1 and mixer 1304 with LO2 downconvert the signals at Input 1 and Input 2 respectively. LO1 and LO2 are coupled to difference mixer 1306 to create the LO signal LO1-LO2. This LO signal drives the coherency restoration mixers 1308 and 1310.

Figure 14:
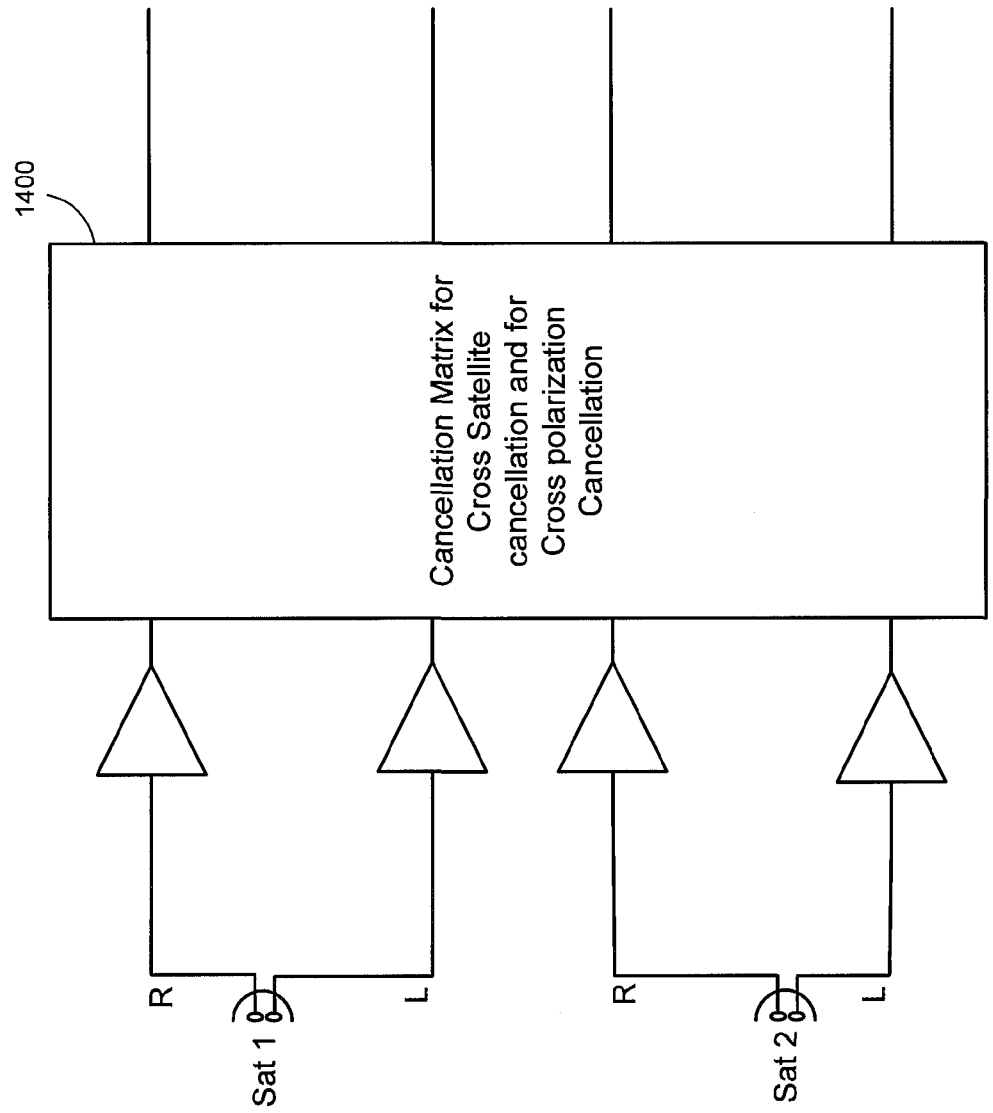
FIG. 14 illustrates that both cross satellite interference cancellation and cross polarization cancellation for two satellites can be achieved with use of the present invention.

FIG. 14 shows a simplified block diagram to illustrate that with a two satellite system, the interference technique of the present invention can be used to cancel both the cross polarization interference of the signals of an individual satellite and can be used to cancel the cross satellite interference of multiple satellites. One embodiment of the cancellation matrix 1400 can be a combination of the crosspole interference cancellation circuit 108 and the cross-satellite interference cancellation circuit 1002.

What is claimed is:

1. A satellite receiver with interference cancellation for canceling interference between a first and a second signal comprising:
   a) a low-noise block converter (LNB) coupled to the first and second signals wherein the LNB comprises a shared local oscillator (LO) for downconverting the first and second signals;
   b) a interference cancellation circuit comprising:
      i) a first adjustable gain and phase circuitry coupled to the first signal; and ii) a first subtraction circuit coupled to the adjustable gain and phase circuitry wherein the gain and phase adjusted first signal is subtracted from the second signal;
c) means for determining level of first signal interference in the second signal; and
d) means for determining phase and gain values to apply to first adjustable gain and phase circuitry for optimal cancellation of the first signal present in the second signal based on the level of first signal interference.

2. The satellite receiver with interference cancellation of claim 1 further comprising:
   a) the interference cancellation circuit further comprising:
      i) a second adjustable gain and phase circuitry coupled to the second signal; and
      ii) a second subtraction circuit coupled to the second adjustable gain and phase circuitry wherein the gain and phase adjusted second signal is subtracted from the first signal;
   b) means for determining level of second signal interference in the first signal; and
   c) means for determining phase and gain values to apply to the second adjustable gain and phase circuitry for optimal cancellation of the second signal present in the first signal based on the level of second signal interference.

3. The satellite receiver of claim 1 wherein the means for determining level of first signal interference comprises a measurement performed in an indoor unit.

4. The satellite receiver of claim 1 wherein the means for determining level of first signal interference comprises a measurement of carrier-to-noise ratio (C/N) of the second signal.

5. The satellite receiver of claim 2 wherein the means for determining level of second signal interference comprises a measurement of carrier-to-noise ratio (C/N) of the first signal.

6. The satellite receiver of claim 2 wherein the means for determining level of second signal interference comprises a measurement performed in an indoor unit.

7. The satellite receiver of claim 1 wherein the first adjustable gain and phase circuitry further comprises a first adjustable time delay circuit.

8. A satellite receiver with interference cancellation for canceling interference between a first and a second signal comprising:
   a) a first local oscillator;
   b) a first downconversion mixer coupled to the first oscillator;
   c) a second local oscillator;
   d) a second downconversion mixer coupled to the second oscillator;
   e) a first coherency restoration mixer coupled to the first oscillator;
   f) a second coherency restoration mixer coupled to the second oscillator;
   g) a first low-noise amplifier wherein the input is coupled to the first signal and the output is coupled to the first downconversion mixer and to the second coherency restoration mixer;
   h) a second low-noise amplifier wherein the input is coupled to the second signal and the output is coupled to the second downconversion mixer and to the first coherency restoration mixer;
   i) a first adjustable gain and phase circuitry;
   j) a first subtraction circuit coupled to the adjustable gain and phase circuitry wherein the gain and phase adjusted second signal is subtracted from the first signal;
   k) means for determining level of second signal interference in the first signal; and
   l) means for determining phase and gain values to apply to adjustable gain and phase circuitry for optimal cancellation of the second signal present in the first signal based on the level of second signal interference.

9. The satellite receiver of claim 8 further comprising:
   a) a second adjustable gain and phase circuitry;
   b) a second subtraction circuit coupled to the adjustable gain and phase circuitry wherein the gain and phase adjusted first signal is subtracted from the second signal;
   c) means for determining level of first signal interference in the second signal; and
   d) means for determining phase and gain values based on the level of first signal interference to apply to adjustable gain and phase circuitry for optimal cancellation of the first signal present in the second signal.

10. The satellite receiver of claim 8 wherein the first adjustable gain and phase circuit further comprises a first adjustable time delay circuit.

11. The satellite receiver of claim 8 wherein the means for determining level of first signal interference comprises a measurement of carrier-to-noise ratio (C/N) of the second signal in a demodulator of an indoor unit and the measurement is communicated to the means for determining phase and gain values.

12. A satellite receiver with interference cancellation for canceling interference between a first and a second signal comprising:
   a) a first local oscillator;
   b) a first downconversion mixer coupled to the first oscillator;
   c) a first low-noise amplifier with an input coupled to the first signal and an output coupled to the first downconversion mixer;
   d) a second local oscillator;
   e) a second downconversion mixer coupled to the second oscillator;
   f) a second low-noise amplifier with an input is coupled to the second signal and an output coupled to the second downconversion mixer;
   g) a difference mixer coupled to the first oscillator and the second oscillator;
   g) a first coherency restoration mixer coupled to the output of difference mixer and to the output of the first downconversion mixer;
   i) a second coherency restoration mixer coupled to the output of difference mixer and to the output of the second downconversion mixer;
   j) a first adjustable gain and phase circuitry coupled to the output of the first coherency restoration mixer;
   k) a second adjustable gain and phase circuitry coupled to the output of the second coherency restoration mixer;
   l) a first subtraction circuit coupled to the second adjustable gain and phase circuitry wherein the gain and phase adjusted second signal is subtracted from the first signal;
   m) a second subtraction circuit coupled to the first adjustable gain and phase circuitry wherein the gain and phase adjusted first signal is subtracted from the second signal;
   n) means for determining level of second signal interference in the first signal;
   o) means for determining phase and gain values to apply to first adjustable gain and phase circuitry for optimal cancellation of the second signal present in the first signal based on the level of second signal interference;
   p) means for determining level of first signal interference in the second signal; and
   q) means for determining phase and gain values to apply to second adjustable gain and phase circuitry for optimal cancellation of the first signal present in the second signal based on the level of first signal interference.

13. A satellite receiver with interference cancellation for canceling interference between a first and a second signal prior to downconversion thereby preserving coherency comprising:
   a) a first low-noise amplifier (LNA) coupled to the first signal;
   b) a second low-noise amplifier (LNA) coupled to the second signal;
   c) a cancellation and frequency translation circuit comprising:
   d) a first interference cancellation circuit comprising:
      i) a first adjustable gain and phase circuitry coupled to the first signal; and
      ii) a first subtraction circuit coupled to the first adjustable gain and phase circuitry wherein the gain and phase adjusted first signal is subtracted from the second signal;
   e) means for determining level of first signal interference in the second signal;
   f) means for determining phase and gain values to apply to first adjustable gain and phase circuitry for optimal cancellation of the first signal present in the second signal based on the level of first signal interference;
   g) a matrix switch coupled to the first output of the first interference cancellation circuit; and
   h) a downconverter circuit coupled to the matrix switch output wherein the output of the downconverter is combined with the output of other downconverters to produce a band stacked signal.

14. The satellite receiver with interference cancellation of claim 13 further comprising:
   a) the second interference cancellation circuit further comprising:
      i) a second adjustable gain and phase circuitry coupled to the second signal; and
      ii) a second subtraction circuit coupled to the second adjustable gain and phase circuitry wherein the gain and phase adjusted second signal is subtracted from the first signal;
   b) means for determining level of first signal interference in the second signal; and
   c) means for determining phase and gain values to apply to second adjustable gain and phase circuitry for optimal cancellation of the second signal present in the first signal based on the level of second signal interference.

* * * * *